United States Patent
Godzaridis et al.

(10) Patent No.: US 10,255,716 B1
(45) Date of Patent: Apr. 9, 2019

(54) MULTI-RESOLUTION TILED 2.5D DELAUNAY TRIANGULATION STITCHING

(71) Applicant: Bentley Systems, Incorporated, Exton, PA (US)

(72) Inventors: Elenie Godzaridis, Quebec (CA); Mathieu St-Pierre, Ste-Brigitte de Laval (CA)

(73) Assignee: Bentley Systems, Incorporated, Exton, PA (US)

( * ) Notice: Subject to any disclaimer, the term of this patent is extended or adjusted under 35 U.S.C. 154(b) by 33 days.

(21) Appl. No.: 15/232,446

(22) Filed: Aug. 9, 2016

(51) Int. Cl.
   *G06T 17/20* (2006.01)
   *G06T 15/60* (2006.01)
   *G06T 7/00* (2017.01)
   *G06T 19/00* (2011.01)

(52) U.S. Cl.
   CPC ............ *G06T 15/60* (2013.01); *G06T 7/0081* (2013.01); *G06T 7/0085* (2013.01); *G06T 19/00* (2013.01); *G06T 2200/04* (2013.01); *G06T 2207/20112* (2013.01); *G06T 2207/20221* (2013.01); *G06T 2210/36* (2013.01)

(58) Field of Classification Search
   None
   See application file for complete search history.

(56) References Cited

U.S. PATENT DOCUMENTS

| | | | |
|---|---|---|---|
| 6,016,153 A * | 1/2000 | Gueziec | G06T 9/40 345/441 |
| 6,184,897 B1* | 2/2001 | Gueziec | G06T 9/001 345/440 |
| 6,262,739 B1 | 7/2001 | Migdal et al. | |
| 9,406,138 B1 | 8/2016 | St-Pierre | |
| 2005/0146522 A1* | 7/2005 | Maillot | G06T 15/06 345/423 |
| 2009/0007011 A1* | 1/2009 | Czerwinski | G06F 17/2288 715/810 |
| 2009/0185741 A1 | 7/2009 | Nahari et al. | |

(Continued)

OTHER PUBLICATIONS

Schon, Bianca, et al. "Three-dimensional spatial information systems: State of the art review." Recent Patents on Computer Science 2.1 (2009): 21-31.*

(Continued)

*Primary Examiner* — Sultana M Zalalee
(74) *Attorney, Agent, or Firm* — Cesari & McKenna, LLP; James A. Blanchette

(57) ABSTRACT

In an example embodiment, a technique is provided for reconstructing a coherent tiled mesh surface that preserves the 2.5D Delaunay property. A spatial index is built for 2.5D data, the spatial index including nodes that correspond to a plurality of tiles of the 2.5D data. A 2.5D Delaunay triangulation algorithm is applied to data of nodes of the spatial index to create a plurality of independent mesh surfaces that each correspond to a tile. The plurality of independent mesh surfaces are stitched together to form the coherent tiled mesh surface. After a coherent mesh surface for a level of detail (LOD) is created, it is determined whether a new level of detail (LOD) is required. If so, one or more independent mesh surfaces that have the new LOD are created and stitching is repeated. Finally, a coherent multi-resolution tiled mesh surface is output.

23 Claims, 19 Drawing Sheets

(56) References Cited

U.S. PATENT DOCUMENTS

| | | | |
|---|---|---|---|
| 2010/0094597 A1* | 4/2010 | Blain | G06T 17/20 |
| | | | 703/1 |
| 2011/0271282 A1* | 11/2011 | Sutter, IV | G06F 9/5027 |
| | | | 718/101 |
| 2011/0310101 A1* | 12/2011 | Prange | G01V 99/00 |
| | | | 345/420 |
| 2013/0300734 A1 | 11/2013 | Schmidt | |
| 2013/0300736 A1 | 11/2013 | Schmidt | |
| 2014/0098090 A1 | 4/2014 | Schmidt et al. | |
| 2014/0267262 A1* | 9/2014 | Masry | G06T 17/20 |
| | | | 345/423 |
| 2016/0125555 A1* | 5/2016 | Branets | G01V 99/005 |
| | | | 705/348 |

OTHER PUBLICATIONS

Chang, Ming-Ching, Frederic Fol Leymarie, and Benjamin B. Kimia. "Surface reconstruction from point clouds by transforming the medial scaffold." Computer Vision and Image Understanding 113.11 (2009): 1130-1146.*

Aizawa, Kunio, et al., "Constant Time Neighbor Finding in Quadtrees: An Experimental Result," IEEE, ISCCSP 2008, Malta, Mar. 12-14, 2008, pp. 505-510.

Samet, Hanan, "Neighbor Finding in Images Represented by Octrees," Academic Press, Inc., Computer Vision, Graphics, and Image Processing, vol. 46, Issue 3, Jun. 1969, pp. 367-386.

Tsai, Victor J.D., "Delaunay Triangulations in TIN Creation: An Overview and a Linear-Time Algorithm," Taylor &Francis Ltd., International Journal of Geographical Information Science, vol. 7, No. 6, Nov. 1, 1993, pp. 501-524.

U.S. Appl. No. 13/106,600, filed May 12, 2011 by Mathieu St-Pierre for View Dependent Query of Multi-Resolution Clustered 3D Dataset, pp. 1-31.

Vu, Hoang Hiep, "Large-Scale and High-Quality Multi-View Stereo," Dec. 5, 2011, pp. 1-154.

"Autodesk® ReMake: Getting Started Guide v.01," Autodesk, Inc., May 2016, pp. 1-53.

"ESRI ArcGIS 9.2 Help—Understanding Terrain Datasets," <http://webhelp.esri.com/arcgisdesktop/92/Index.cfm?TopicName=Creating_terrains_in_a_geodatabase>, Mar. 12, 2008, pp. 1-22.

"ESRI ArcGis 10.2 Help—Fundamentals of Surfaces," <http://resources.arcgis.com/en/help/main/10.2/index.html#/Resolution_of_a_raster_surface/00q8000000w8000000/>, Oct. 30, 2014, pp. 1-25.

"ESRI ArcGis 10.2 Help—LAS Dataset ," <http://resources.arcgis.com/en/help/main/10.2/index.html#/as_a_surface/015w0000005w000000/>, Oct. 30, 2014, pp. 1-95.

"ESRI ArcGis 10.2 Help—TIN," <http://resources.arcgis.com/en/help/main/10.2/index.html#/as_TIN_nodes_by_elevation/00600000001p000000/>, Oct. 30, 2014, pp. 1-39.

Feldman, Bryan E., et al., "Animating Gases with Hybrid Meshes," Computer Graphics Proceedings, Annual Conference Series 2005, ACM SIGGRAPH2005, Los Angeles, CA, Aug. 1-4, 2005, pp. 904-909.

Wake, Dan, et al., "A Hybrid Mesh Generation Method for Two and Three Dimensional Simulation of Semiconductor Processes and Devices," ResearchGate, CiteSeer, May 2000, pp. 1-8.

* cited by examiner

MULTI-RESOLUTION TILED 2.5D DELAUNAY TRIANGULATION STITCHING

BACKGROUND

Technical Field

The present disclosure relates generally to visualizing 2.5D data, and more specifically to techniques for reconstructing a coherent tiled mesh surface that preserves the 2.5D Delaunay property.

Background Information

Visualizing and analyzing 2.5D data, such as 2.5D terrain data, often involves reconstructing (e.g., triangulating) a mesh surface represented by the data. However, surface reconstruction techniques, such as the 2.5D Delaunay triangulation algorithm, typically can only process (e.g., triangulate) a limited number of points at a time (e.g., since the points may need to be loaded into system memory, and the system memory typically has a limited size). As such, when there is a large amount to 2.5D data, the data may be treated as a series of tiles that cover different areas, the tiles reconstructed separately and then combined. However, when reconstructed separately, regions near the boundaries of tiles typically do not yield the same results as would be produced if the data was treated as a whole. This may yield discontinuities and other irregularities in the mesh surface when the tiles are combined, which must be tolerated or disguised (e.g., using visual "tricks") when the mesh surface is displayed. If analysis is applied to the mesh surface, the irregularities may lead to inaccurate results in the analysis (e.g., incorrect volume calculations, vector draping, etc.).

The difficulties encountered when trying to reconstruct tiles separately for later combination stem from a number of factors. Because a 2.5D Delaunay triangulation algorithm creates a convex polygon (i.e. a convex hull) around 2.5D data, there can be long, less accurate triangles near the boundaries of the surface mesh for a given tile. These triangles may overlap with the meshes of one or more neighboring tiles. Triangles created to form the convex polygon are often not required to respect the 2.5D Delaunay criterion (i.e. that the circumcircle of a triangle may not contain points other than the three of the triangle itself). Also, holes in mesh surface may present problems, being filled by long, less accurate triangles. Likewise, variations in sampling distance resulting in some triangles being larger than others may present problems, causing circumcircles of larger triangles not on the boundaries themselves to potentially intersect tile boundaries. In such cases, it may be difficult to ensure that such larger triangles meets the 2.5D Delaunay criterion. These and other challenges are not adequately or efficiently addressed by existing techniques.

Further, when there is a large amount of 2.5D data, it is often desirable to produce decimated representations of the full resolution 2.5D data. Such decimated representations may allow for faster display on an electronic device, or faster (though less precise) analysis to be performed. However, existing techniques have often not efficiently supported multiple levels of detail (LOD).

Given the shortcomings of existing techniques, there is a need for an improved technique for reconstructing a coherent tiled mesh surface that preserves the 2.5D Delaunay property. It would further be desirable that such technique efficiently supports multiple LODs.

SUMMARY

A technique is provided for reconstructing a coherent tiled mesh surface from 2.5D data that preserves the 2.5D Delaunay property. The technique may accurately represent boundary regions (avoiding the need for visual "tricks"), and permit analysis (e.g., volume calculations, vector draping, etc.) to be performed on very large mesh surfaces without inaccuracies. Further, the technique may support multi-resolution so meshes in which tiles of a given LOD are fully connected together.

In an example embodiment, a spatial index is built for 2.5D data, the spatial index including nodes that correspond to a plurality of tiles of the 2.5D data. A 2.5D Delaunay triangulation algorithm is applied to data of nodes of the spatial index to create a plurality of independent mesh surfaces that each correspond to a tile. The plurality of independent mesh surfaces are stitched together to form a coherent tiled mesh surface. The stitching, for each independent mesh surface, involves removing boundary triangles and triangles influenced by neighboring tiles from the independent mesh surface, triangulating points of removed triangles with constraints (including constraints from neighboring tiles) to produce a context, merging the context and the remaining triangles of the independent mesh surface to produce an uncut stitched mesh surface, and cutting the uncut stitched mesh surface to the tile's boundary. After a coherent mesh surface for a given LOD is created, it is determined whether a new LOD is required. If so, one or more independent mesh surfaces that have the new LOD are created and stitching is repeated. Finally, a coherent multi-resolution tiled mesh surface is output.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
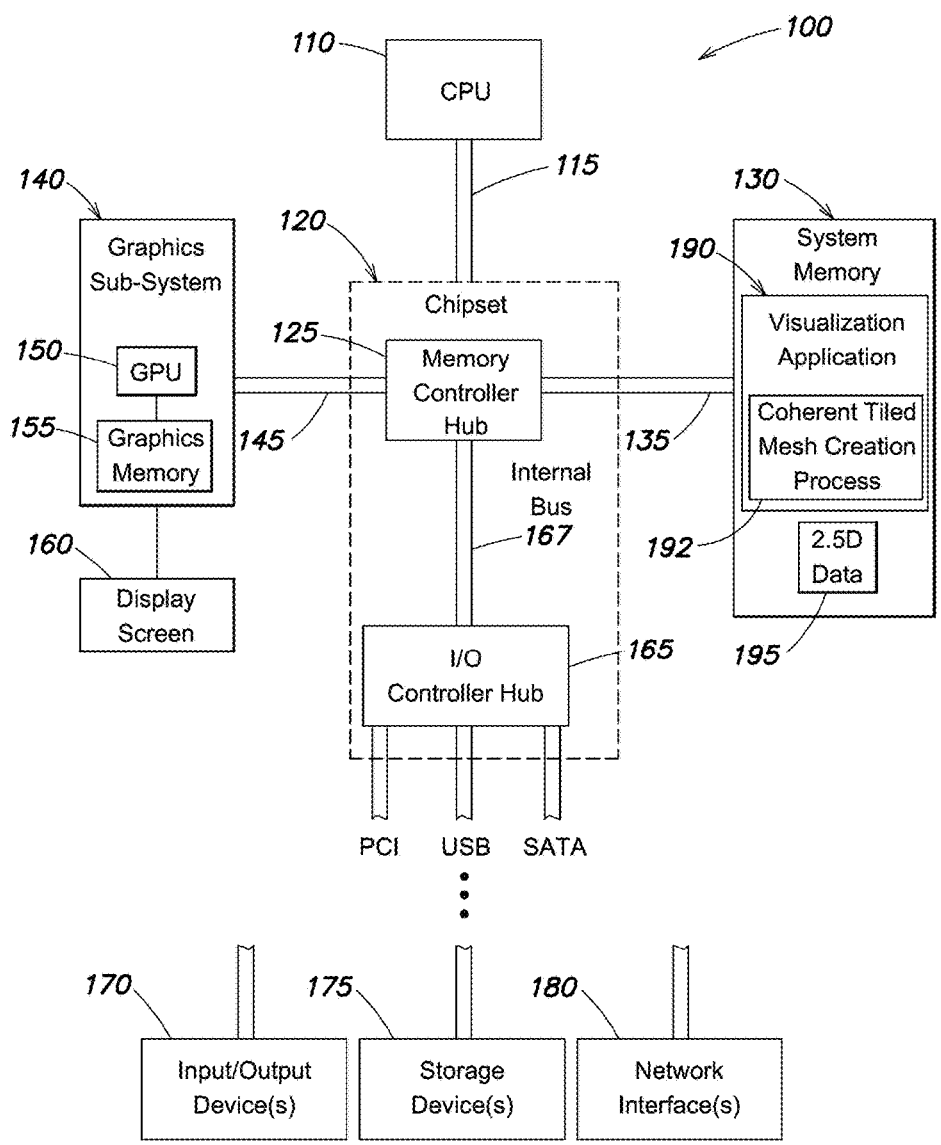
FIG. 1 is a block diagram of an example electronic device (e.g., an example computer) that may be used with the present techniques.

FIG. 1 is a block diagram of an example electronic device 100 (e.g., an example computer) that may be used with the present techniques. The electronic device includes a central processing unit (CPU) 110 that may be coupled to a chipset 120 by a front side bus 115. The chipset 120 includes a memory controller hub 125 that is responsible for communications with high-speed devices such as system memory 130 and a graphics subsystem (e.g., a graphics card) 140. The memory controller hub 125 is coupled to the system memory 130 by a high-speed memory bus 135. The system memory 130 is typically volatile memory, such as a Random Access Memory (RAM), which is adapted to store a wide range of software and data being actively used by the CPU 110. The memory controller hub 125 is coupled to a graphics subsystem 140 (e.g., a graphics card) by a high-speed graphics bus 145. The graphics subsystem 140 includes a GPU 150 and graphics memory 155, among other components. The graphics subsystem 140 is coupled to at least one display screen 160.

The chipset 120 further includes an input/output controller hub 165 coupled to the memory controller hub by an internal bus 167. Among other functions, the input/output controller hub 165 may support a variety of types of peripheral buses, such as a peripheral component interconnect (PCI) bus, a universal serial bus (USB) bus, and/or a Serial Advanced Technology Attachment (SATA) bus, for connecting to other system components. The system components may include one or more I/O devices 170, such as a keyboard, a mouse, a removable media drive, etc., one or more persistent storage devices 175, such as a hard disk drive, a solid-state drive, or another type of persistent data store, one or more network interfaces 180, such as an Ethernet interface or a Wi-Fi adaptor, among other system components. The network interface(s) 180 may allow communication with other electronic devices over a computer network, such as the Internet, to enable various types of collaborative, distributed, or remote computing.

Working together, the components of the electronic device 100 (and other electronic devices in the case of collaborative, distributed, or remote computing) may execute a number of different types of software that operate upon data of different types. For example, software of a visualization application 190 and 2.5D data 195 that are loaded from a storage device 175 to the system memory 130 when needed, and provided to the CPU 110 and other system components. In one specific implementation, the visualization application 140 is a Microstation® based modeling, documentation, and/or display application available from Bentley Systems, Inc. of Exton, Pa., that includes a coherent tiled mesh creation process 192. Further, in one specific implementation, the 2.5D data 195 is 2.5D terrain data captured by LiDAR or another data acquisition technique, and structured as a plurality of tiles corresponding to different portions of a covered area. The 2.5D data 195 may be distributed homogenously (e.g., a digital elevation model (DEM) raster) or heterogeneously over the covered area. Further, the 2.5D data 195 may include one or more constraints (e.g., "holes" for which no data is present, break lines, islands, etc.).

Figure 2:
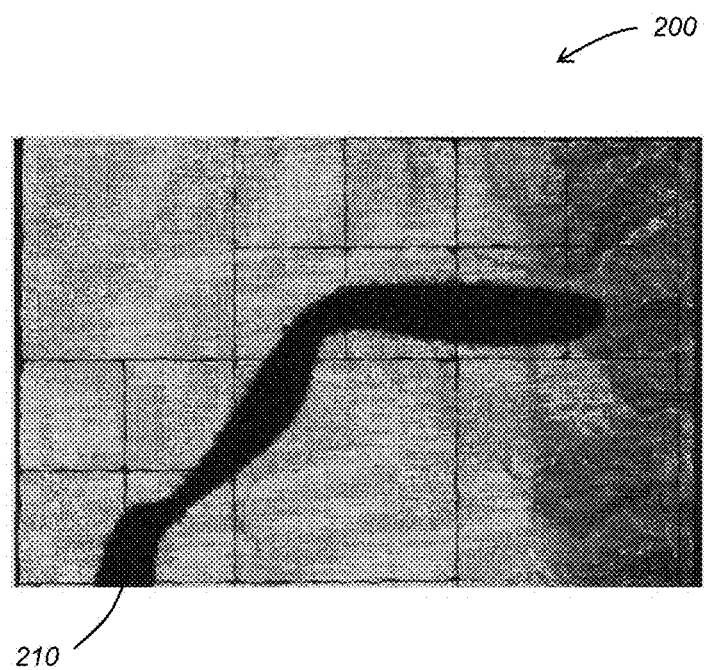
FIG. 2 is an example un-stitched tiled mesh surface, showing discontinuities between tiles.
Figure 3:
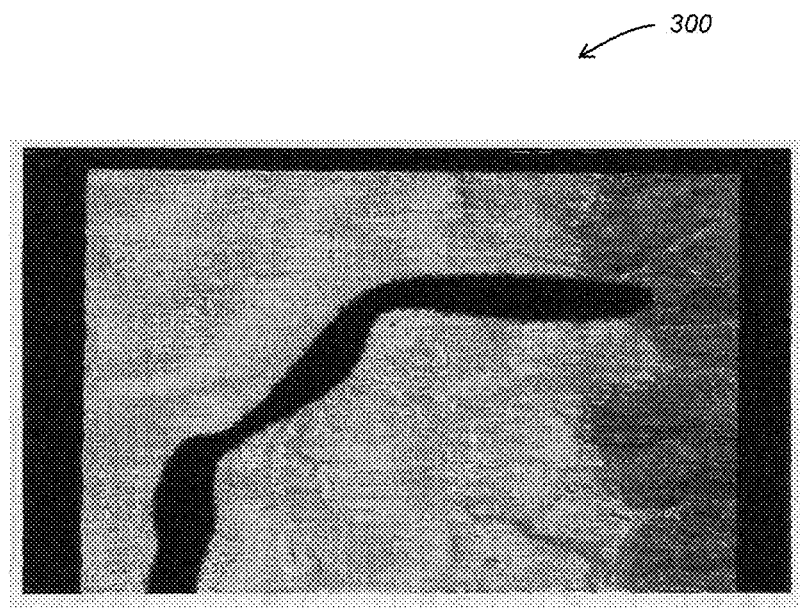
FIG. 3 is an example stitched tiled mesh surface, generated from the un-stitched tiled mesh surface of FIG. 2.

In order to visualize the 2.5D data 195 data, the visualization application 190 may utilize the coherent tiled mesh creation process 192 to reconstruct a coherent multi-resolution tiled mesh surface from the tiles of the 2.5D data 195 (e.g., to represent the surface of the terrain). The reconstruction may involve first creating an unstitched tiled mesh surface. FIG. 2 is an example un-stitched tiled mesh surface 200, showing discontinuities between tiles. In this example, the mesh surface includes a hole constraint 210. The reconstruction may then stitch together the tiles, to create a coherent tiled mesh surface (sometimes referred to as a stitched mesh surface) for at least one resolution. FIG. 3 is an example stitched tiled mesh surface 300, generated from the un-stitched tiled mesh surface 200 of FIG. 2. Preferable, the stitching preserves the 2.5D Delaunay property to ensure the quality of the resulting surface, among other desirable properties.

Figure 4:
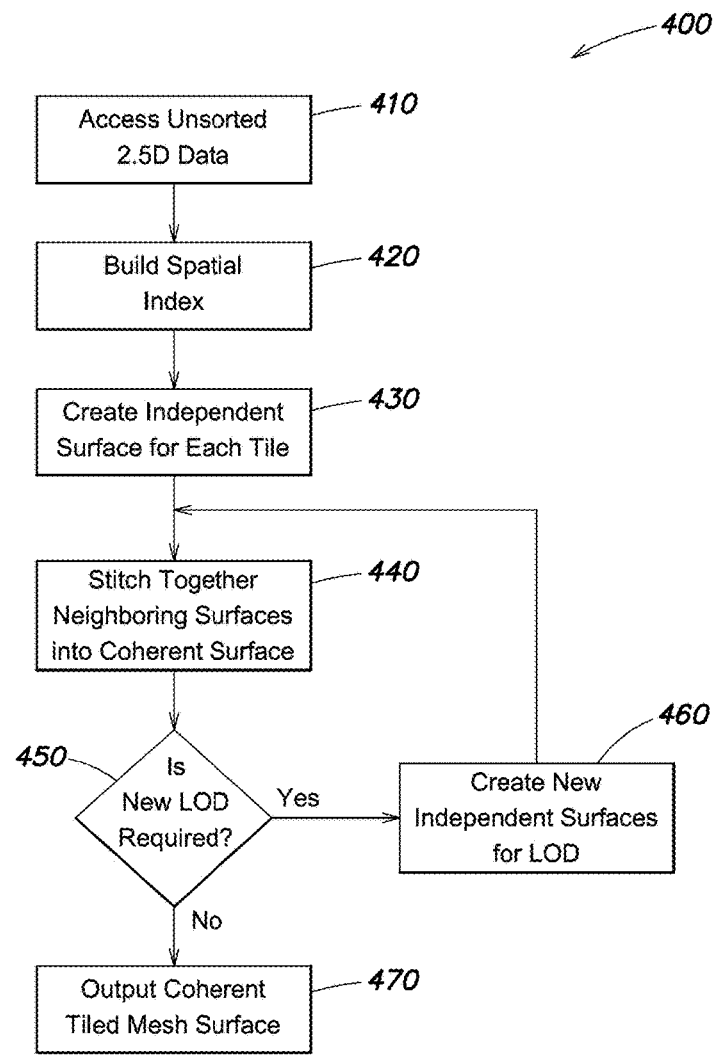
FIG. 4 is a flow diagram of an overall sequence of steps for reconstructing a coherent multi-resolution tiled mesh surface that preserves the 2.5D Delaunay property.

FIG. 4 is a flow diagram of an overall sequence of steps for reconstructing a coherent multi-resolution tiled mesh surface that preserves the 2.5D Delaunay property. At step 410, the coherent tiled mesh creation process 192 of the visualization application 140 accesses the 2.5D data 195 which is initially unsorted. At step 420, the process 192 builds a spatial index to sort the data. The spatial index has nodes that correspond to the tiles of the 2.5D data 195 that are related by neighbor relationships. At step 430, the process 192 applies a 2.5D Delaunay triangulation algorithm to data of nodes of the spatial index to create a plurality of independent mesh surfaces that each correspond to a tile. Then, at step 440, the process 192 stitches together neighboring ones of the plurality of independent mesh surfaces of tiles to form a coherent tiled mesh surface. Once a surface of one resolution (e.g., full resolution) is complete, the process 192, at step 450, checks if a new lower LOD is required. If a new LOD is required, at step 460, one or more new independent mesh surfaces (with less triangles than the proceeding) are created for tiles, and execution loops back to step 440, where the new lower LOD surfaces for the tiles are stitched. Once there is no new LOD required, execution proceeds to step 470, where a coherent, multi-resolution mesh surface is output, for example, to the display screen 160.

Building a Spatial Index

Figure 5A:
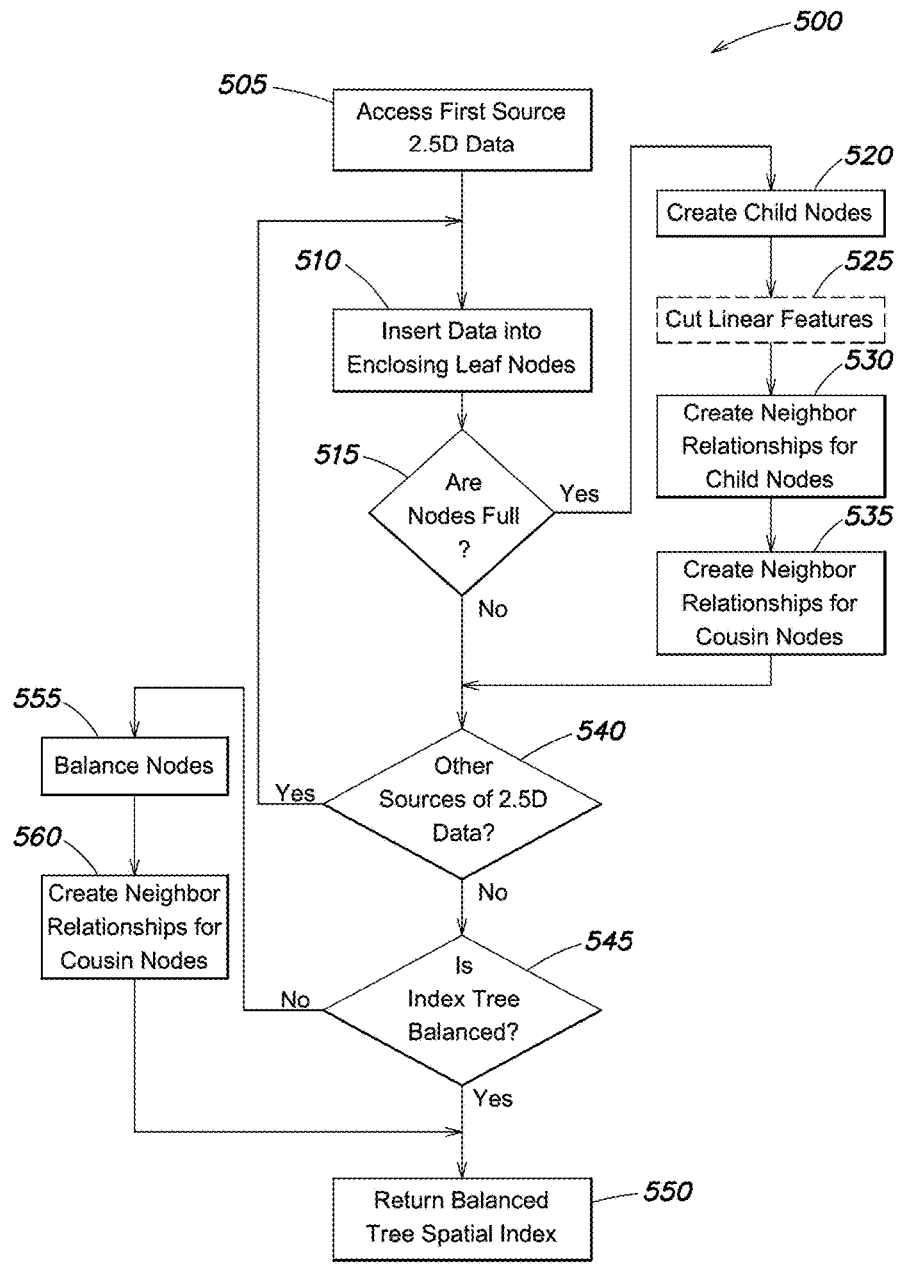
FIG. 5A is a flow diagram detailing steps that may be executed to build the spatial index with neighbor relationships of step of FIG. 4.
Figure 5B:
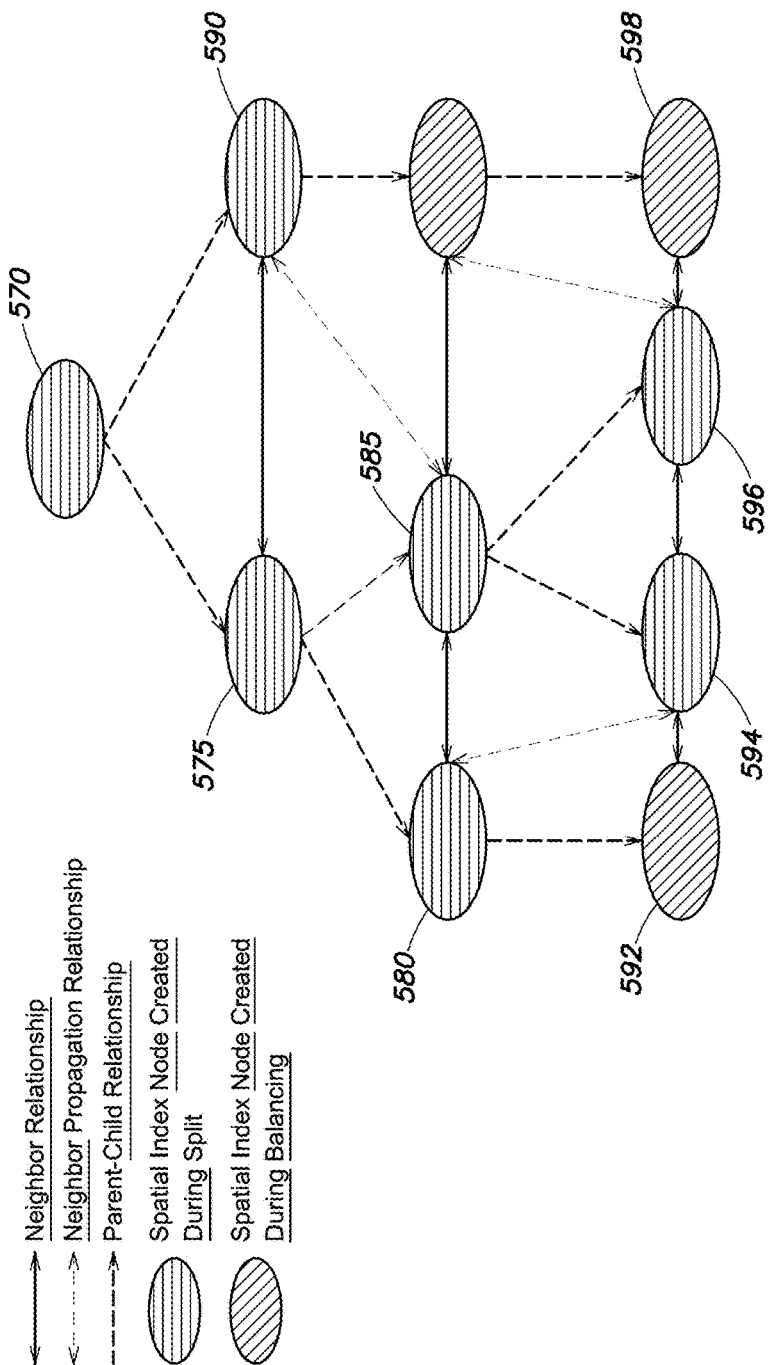
FIG. 5B is a diagram of an example spatial index with neighbor relationships that may be created by the steps of FIG. 5A.

The steps 400 of FIG. 4 may be better understood by considering them in more detail. FIG. 5A is a flow diagram detailing steps 500 that may be executed to build the spatial index with neighbor relationships of step 420 of FIG. 4. FIG. 5B is a diagram 502 of an example spatial index with neighbor relationships that may be created by the steps 500 of FIG. 5A. The example spatial index includes a root node 570 and a plurality of leaf nodes 592-598. In this example, the spatial index is a quad-tree spatial index. At step 505, a first source of the 2.5D data 195 is accessed. At step 510, the data of the source is inserted into a leaf node (or nodes) enclosing the data. At step 515, a determination is made whether one or more of the leaf nodes are full, and need to be split into child nodes. If so, execution proceeds to step 520, where child nodes are created, and data pushed into the child nodes. An example of such a split may be seen in FIG. 5B, where node 575 is split into child nodes 580 and 585. The child nodes 580 and 585 have a parent-child relationship with the node 575 from which they were split. At optional step 525, if some of the data pushed into the child nodes includes linear constraints that cross node boundaries, it may be cut along the node boundaries. For example, if a polygon crosses through several nodes, it may be cut into parts that each reside in one and only one node, creating extra points at boundaries if necessary.

At step 530, neighbor relationships are created for newly created child nodes. For example, referring again to FIG. 5B, a neighbor relationship may be created between child nodes 580 and 585. At step 535, neighbor relationships for cousin nodes are created by propagating the neighbor relationships for siblings of parent nodes to the child nodes. For, example, referring again to FIG. 5B, the neighbor relationship with node 590 which may be prorogated to child node 585.

Upon completion of step 535, or if the one or more of the leaf nodes are were not full at step 515 and there was no need to split into child nodes, execution proceeds to step 540. At step 540, it is determined if there are other sources of the 2.5D data 195. If so, another source of data is accessed, and execution loops back to step 510. If not, execution proceeds to step 545, where it is determined whether the spatial index tree is balanced. If so, a balanced tree spatial index with full neighbor relationships is returned at step 550. If not, execution proceeds to step 555, were balancing is performed, creating nodes to ensure that all the leaf nodes are at the same level, and to step 560, where neighbor relationships for cousin nodes are created. Execution then proceeds to step 550, where a balanced tree spatial index with full neighbor relationships is returned.

Surface Reconstruction

Figure 6A:
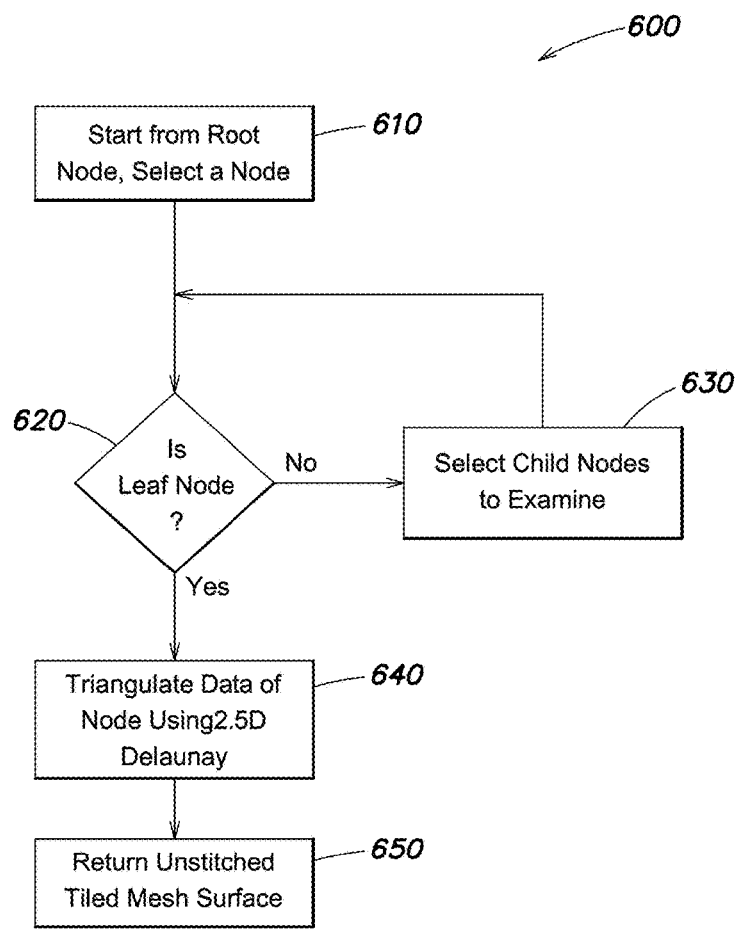
FIG. 6A is a flow diagram detailing steps that may be executed to use data of nodes of the spatial index to create a plurality of independent mesh surfaces at the full resolution.
Figure 6B:
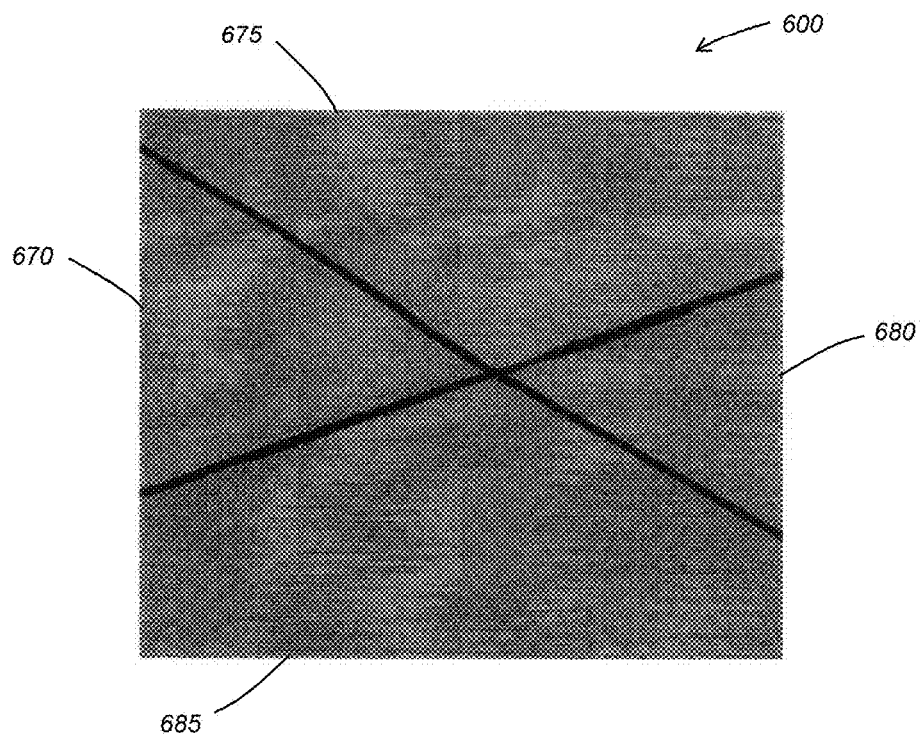
FIG. 6B is an example unstitched tiled mesh surface.

Now looking to step 430 of FIG. 4 in more detail, FIG. 6A is a flow diagram detailing steps 600 that may be executed to use data of nodes of the spatial index to create a plurality of independent mesh surfaces for the full resolution. At step 610, surface reconstruction starts from the root node of the spatial index and selects a node. At step 620, a check is performed whether the selected node being is a leaf node. If the node being examined is not a leaf node, execution proceeds to step 630, where each the node's child nodes are selected to be examined, and execution loops back to step 620. Steps 620 and 630 are applied recursively until all leaf nodes are found. Then, at step 640, for each leaf node, a 2.5D Delaunay triangulation algorithm is applied to the data of the leaf node, thereby creating an independent mesh surface for a tile from every leaf node. At step 650, a set of independent mesh surfaces (also referred to as an unstitched tiled mesh surface) is returned. FIG. 6B is an example unstitched tiled mesh surface 660. As can be seen, there are independent tiles 670-685 that are not stitched together.

LOD Creation

Figure 7:
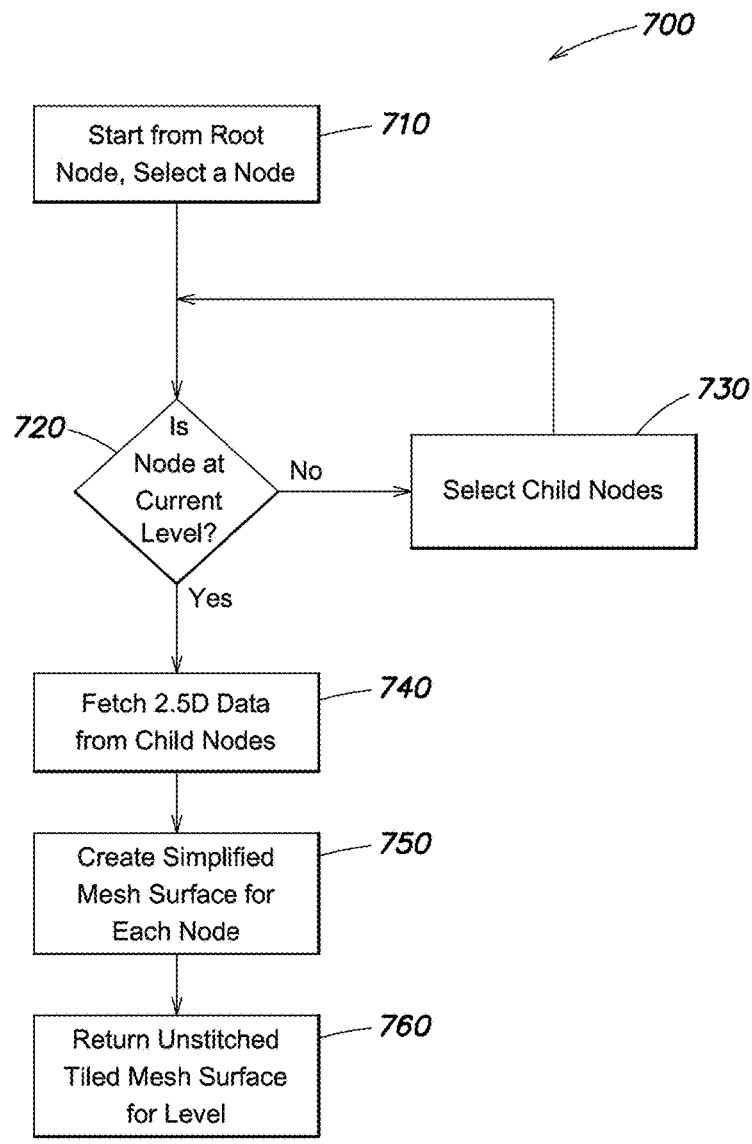
FIG. 7 is a flow diagram detailing steps that may be executed to create new independent mesh surfaces to support another LOD.

Now looking to step 460 of FIG. 4 in more detail, FIG. 7 is a flow diagram detailing the steps 700 that may be executed to create new independent mesh surfaces to support another LOD. At step 710, LOD creation selects a node starting from the root node of the spatial index. At step 720, a check is performed whether the node being examined is at the LOD currently being constructed. If the node being examined is not at the current level, execution proceeds to step 730 where each of the child nodes are examined, and execution loops back to step 720. Steps 720 and 730 are applied recursively until all nodes at the LOD currently being constructed are examined. For each node at the LOD currently being constructed, at step 740, 2.5D data from its child nodes is fetched. At step 750, a simplified mesh surface is created using a simplification algorithm, for example, an edge collapse-based simplification algorithm or a random selection-based simplification algorithm, for each node. At step 760, an unstitched tiled mesh surface composed of the independent mesh surfaces is returned.

Stitching

Figure 8A:
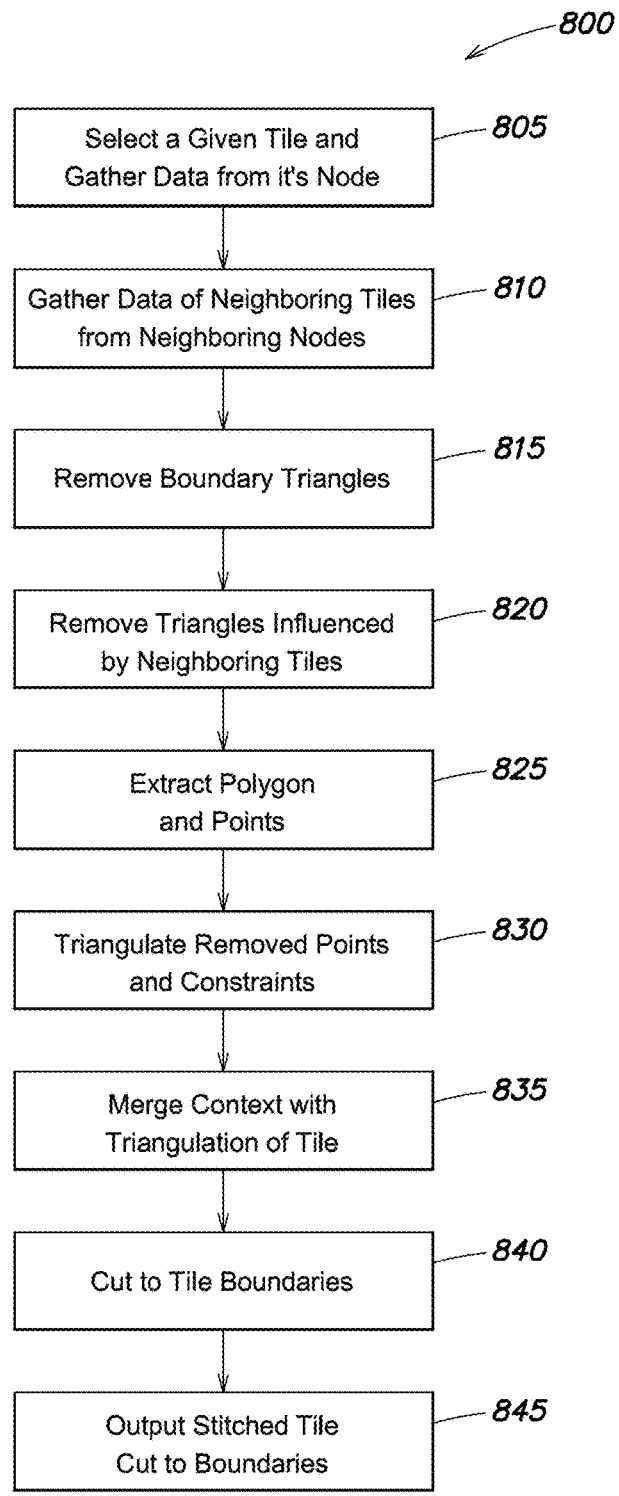
FIG. 8A is a flow diagram detailing steps that may be executed to stitch together a plurality of independent mesh surfaces to form a coherent tiled mesh surface.
Figure 8B:
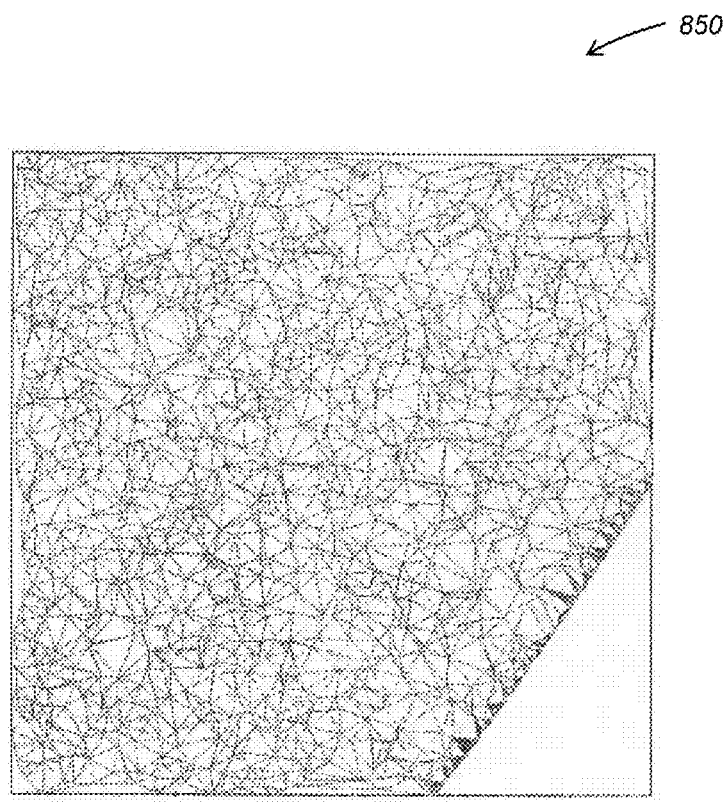
FIG. 8B is an example of a tile with a hole constraint that may be selected.
Figure 8C:
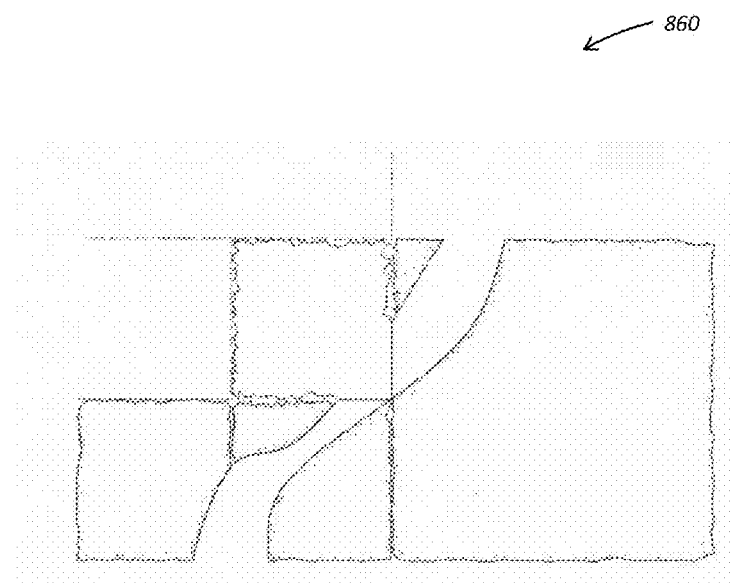
FIG. 8C is an example of a set of points and constraints to be re-meshed based on their ability to influence the mesh of a given tile.
Figure 8D:
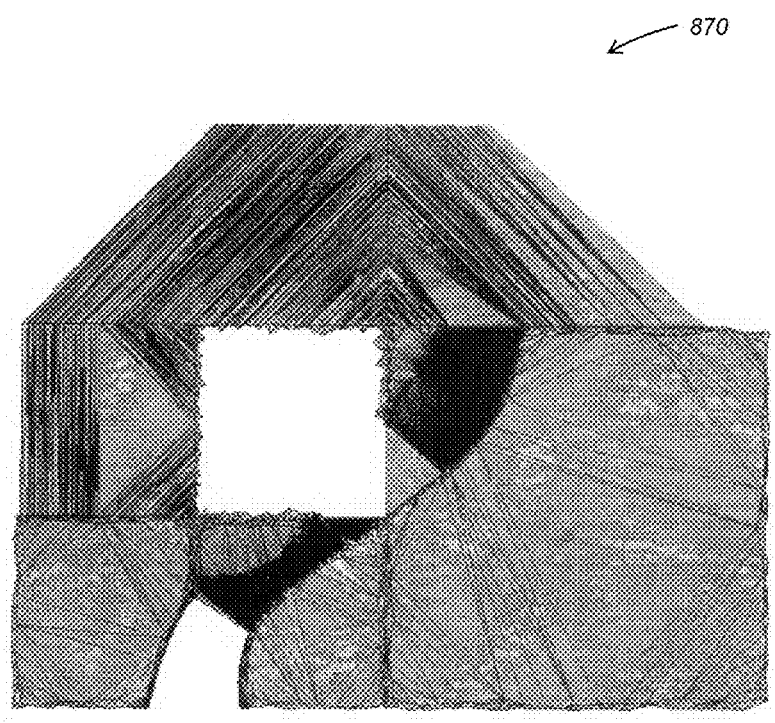
FIG. 8D is an example of a stitched tile and context obtained for its neighboring tiles.
Figure 8E:
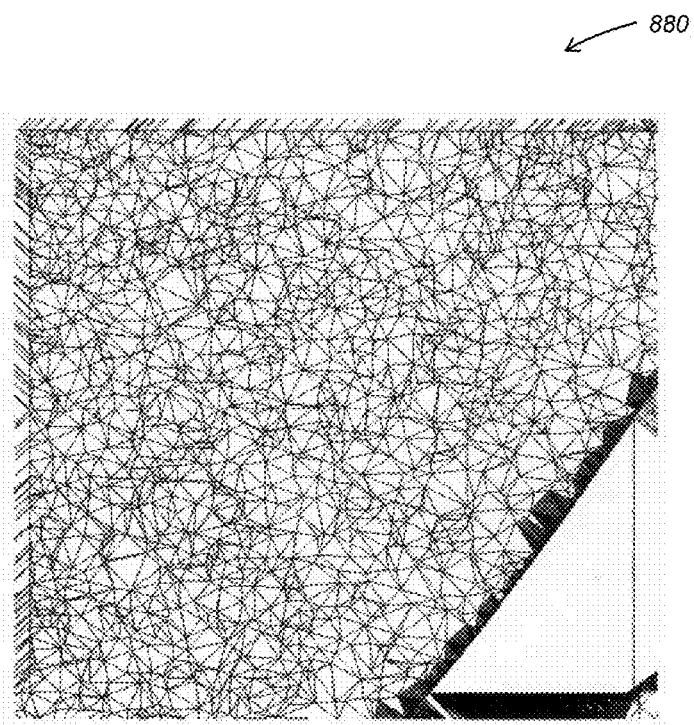
FIG. 8E is an example of a stitched version of the given tile, showing the surface mesh before it is cut to the tile's boundaries.
Figure 8F:
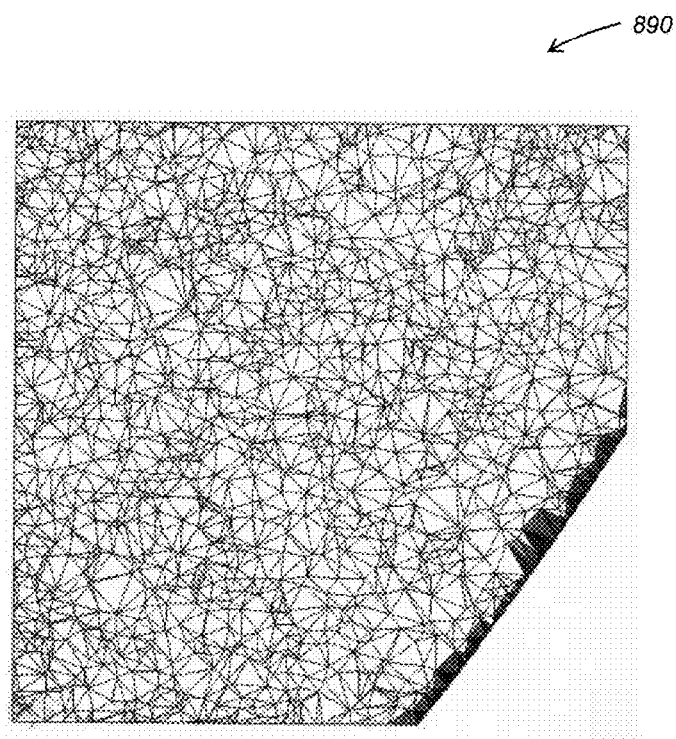
FIG. 8F is an example of the stitched tile after being cut to the tile's boundaries.

Now looking to step 440 of FIG. 4 in more detail, FIG. 8A is a flow diagram detailing steps 800 that may be executed to stitch together a plurality of independent mesh surfaces to form a coherent tiled mesh surface. At step 805, a given tile is selected and 2.5D date from its node is gathered. FIG. 8B is an example of a tile 850 with a hole constraint that may be selected. In this example, the tile does not overlap with neighboring tiles and is not completely filled with triangles around its boundaries. At step 810, data for neighboring tiles around the given tile is gathered from neighboring nodes. Next, at step 815, boundary triangles of the given tile nearest the boundaries of the given tile are removed. Then, at step 820, triangles are removed that are influenced by neighboring tiles. For example, starting from the boundaries of the tile, triangles may be removed iteratively if they have a circumcircle that intersect the bounding polygon of neighboring tiles. At step 825, a polygon surrounding all the remaining triangles that have not been removed is computed, and added as a void constraint as well as all points from the data 195 on this polygon. The goal of the constraint is to select points of the given tile that need to be stitched and to avoid creating triangles inside the regions that do not have to be stitched. FIG. 8C is an example of a set of points and constraints 860 to be re-meshed based on their ability to influence the mesh of the given tile. Then, at step 830, points from the triangles that have been removed are triangulated, as are any constraints from the given tile and the neighboring tiles. FIG. 8D is an example of the stitched tile and context obtained for its neighboring tiles 870. The context created by this triangulation fills in missing triangles at the sides of the tile while respecting preexisting constraints and not generating triangles that would overlap with the triangulation before the stitching process (as shown in FIG. 8B). At step 835, the context created by the triangulation of step 830 is merged with the existing triangulation of the given tile to create a stitched tile. FIG. 8E is an example of a stitched version 880 of the given tile, showing the surface mesh before it is cut to the tile's boundaries. At step 840, the surface mesh of the given tile is cut to tile boundaries to ensure all triangles fit precisely within them. FIG. 8F is an example of the stitched tile after being cut to the tile's boundaries 890. At step 845, the cut and stitched tile is output.

Extracting Points to be Stitched

Figure 9:
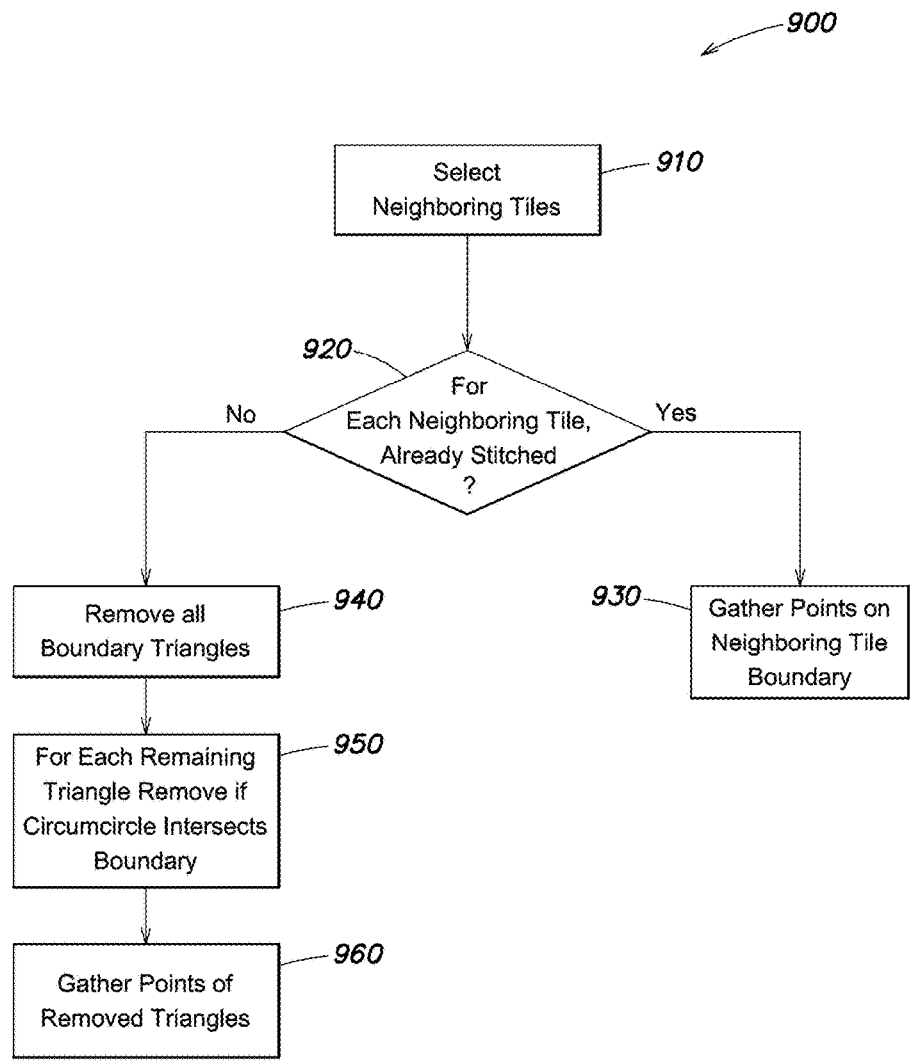
FIG. 9 is a flow diagram detailing steps that may be executed to select points of the given tile that need to be stitched with neighboring tiles.

Now looking to steps 810-820 of FIG. 8A in more detail, FIG. 9 is a flow diagram detailing the steps 900 that may be executed to select points of the given tile that need to be stitched with neighboring tiles. At step 910, neighboring tiles are selected for the given tile. At step 920, for each neighboring tile, a determination is made whether the tile has already been stitched. For any neighboring tile that has already been stitched, execution proceeds to step 930, where points lying on the neighboring tile's boundaries shared with the given tile are gathered and added to the list of points to be triangulated to produce a stitched version of the given tile. Since a stitched tile's boundaries have been cut, it is ensured that the relevant pints will be on the boundaries. For the given tile to be stitched, and for any neighboring tile has not already been stitched, execution proceeds to step 940, where all boundary triangles (i.e. triangles where at least one edge is not shared with another triangle) are removed. Further, remaining triangles in the tile are processed starting from the boundaries. At step 950, for each triangle, if the triangle's circumcircle intersects the boundaries of its neighbor, the triangle is removed. At step 960, the points forming the removed triangles are collected to be stitched.

Applying Constraints

Figure 10:
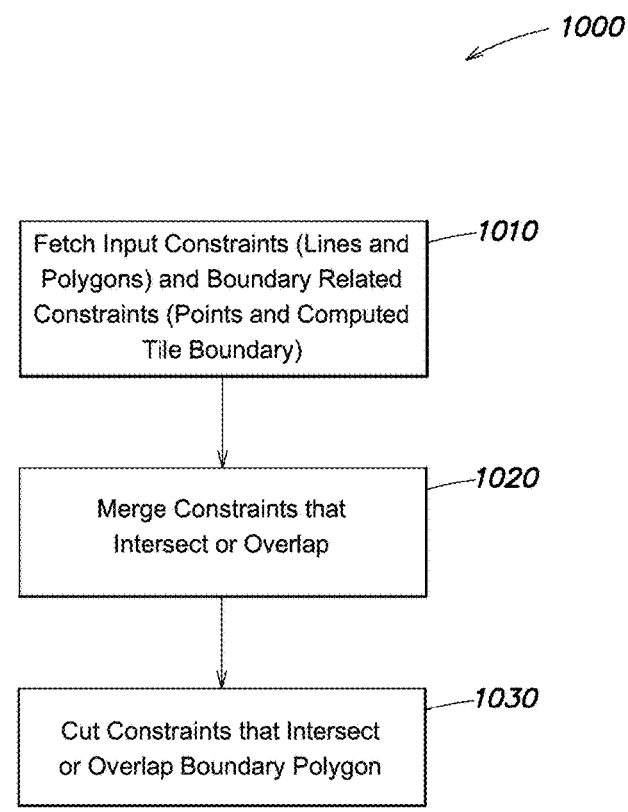
FIG. 10 is a flow diagram detailing steps that may be executed to apply constraints during a 2.5D Delaunay triangulation.

Now looking to the application of constraints, FIG. 10 is a flow diagram detailing the steps 1000 that may be executed to apply constraints during a 2.5D Delaunay triangulation, as part of the above discussed steps. At step 1010, constraints are fetched, including input constraints (e.g., lines and polygons from the underlying 2.5D data 195) and tile boundary-related constraints (e.g., points and computed tile boundaries). At step 1020, constraints that interest or overlap (e.g., include a shared edge or vertex) are merged to prevent triangulation artifacts. At step 1030, constraints are cut that intersect or overlap the boundary polygon created during stitching, so as to remove the intersection.

Stitching in Parallel

Figure 11A:
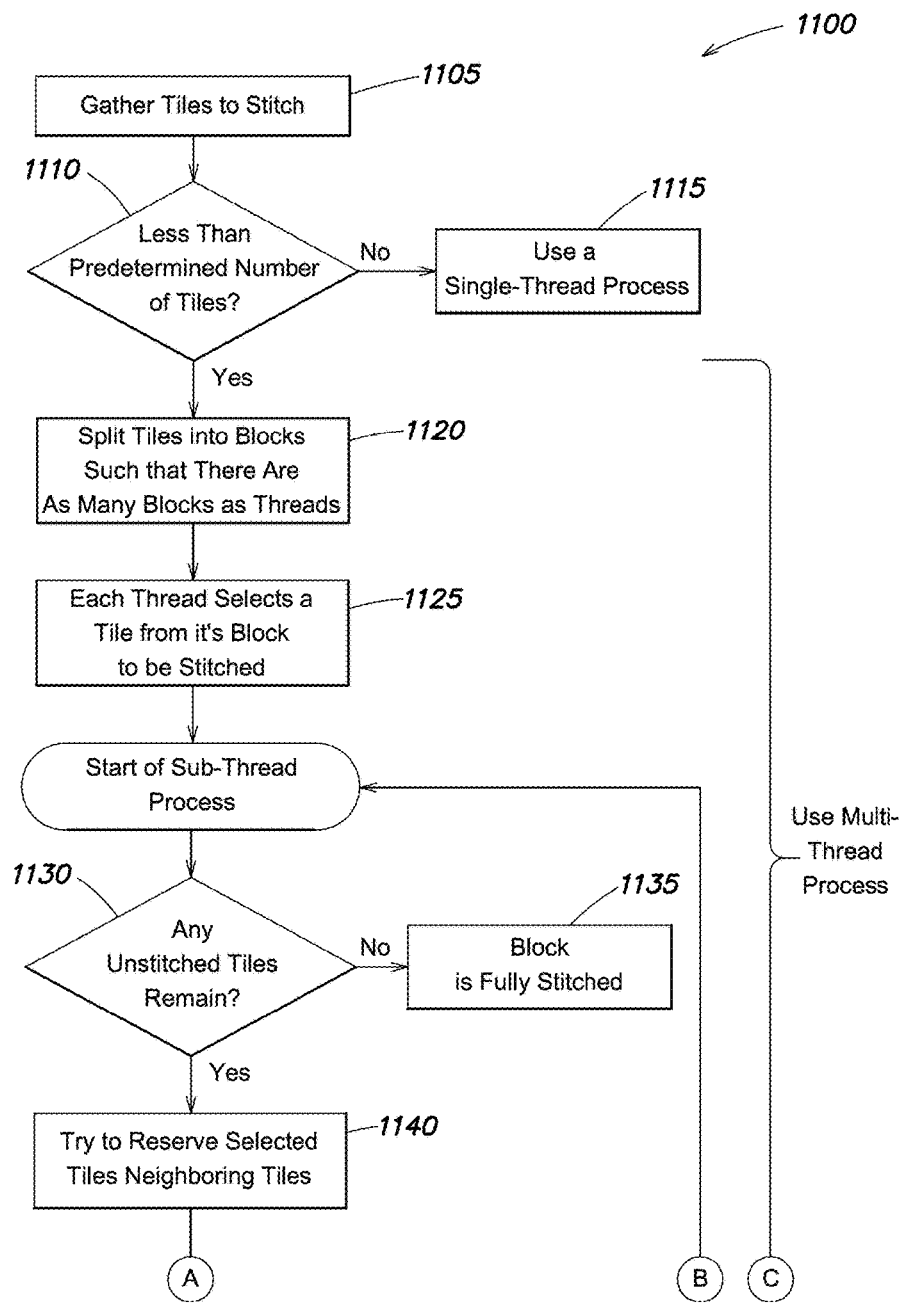
FIGS. 11A and 11B together are a flow diagram of an example sequence of steps for performing stitching in parallel.
Figure 11B:
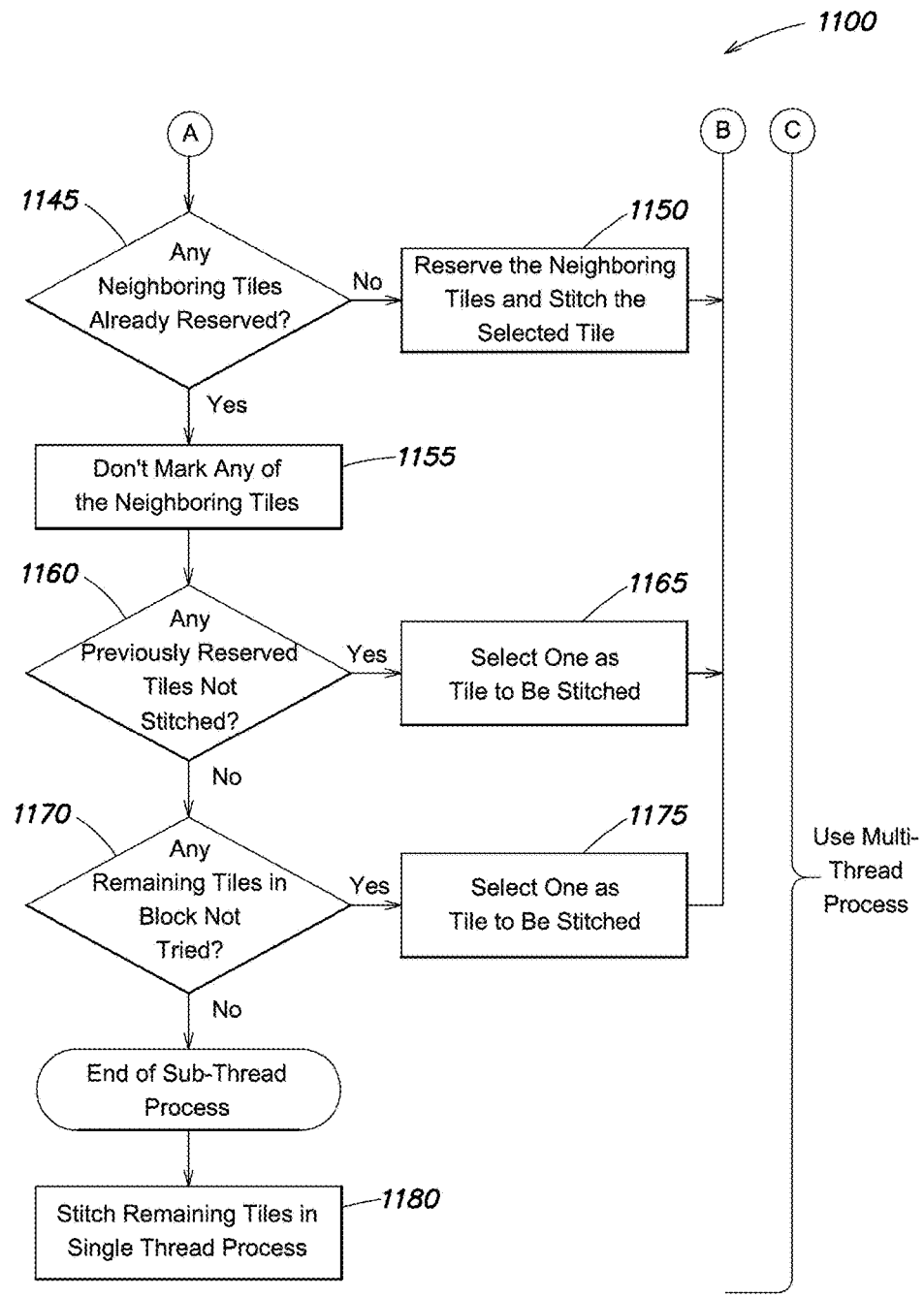

The stitching of FIG. 8 may be computationally costly, and therefore time consuming. Enhancing the above described stitching to enabling stitching to be performed in parallel may reduce overall computation time, taking advantage of multi-threading capabilities of processors, such as CPU 110. FIGS. 11A and 11B together are a flow diagram of an example sequence of steps 1100 for performing stitching in parallel. At step 1105, tiles that should be stitched for a current LOD are gathered. At step 1110, it is determined whether there are less than a predetermined number of tiles (e.g., 72 tiles) to be stitched for the current LOD. If there is less than a predetermined number of tiles, execution proceeds to step 1115, where stitching is performed one tile at a time, using a single thread. Such single thread may execute steps as discussed above in FIG. 8. If there is at least or more than the predetermined number of tiles, execution proceeds to steps 1120-1180 where stitching is performed in parallel. At step 1120, a list of neighboring tiles for a given tile is split into "blocks" to be handled by respective threads, such that each thread handles an approximately equal number of tiles. The list of neighboring tiles may be created during steps 530 and 535 of the index creation of FIG. 5A, and maintained as metadata of the given tile. At step 1125, each thread tries to select a tile from its respective block to be stitched. A sub-thread process composed of steps 1130-1175 is then performed by each thread for the thread's selected tile.

At step 1130, a determination is made whether any unstitched tiles remain. If no unstitched tiles remain for a thread, execution proceeds to step 1135 where it is concluded that the block is coherent (i.e. fully stitched) and the sub-thread process ends. If unstitched tiles remain, execution proceeds to step 1140 where, for the currently selected tile to be stitched by the thread, all of the selected tile's neighboring tiles are tentatively marked as "reserved" by the thread, even if they do not belong to the thread's block according to the split of step 1120. At step 1145, it is determined whether any of the tentatively reserved neighboring tiles have already been reserved by another thread. If none of the tentatively reserved neighboring tiles have already been reserved by another thread, execution proceeds to step 1150, where the tentative reserved tiles are marked as reserved, and the currently selected tile to be stitched is stitched to them, and execution loops back to step 1130. If any of the tentatively reserved neighboring tiles have already been reserved by another thread, execution proceeds to step 1155, where none of the tentatively reserved neighboring tiles are actually marked reserved. Then, at step 1160, it is determined whether any previously reserved tiles have not been stitched. If there is a previously reserved tile that has not been stitched, at step 1165, such tile is given priority and is selected as the tile to be stitched by the thread, and execution loops back to step 1130. If there are no previously reserved tiles that has not been stitched, execution proceeds to step 1170, where it is determined whether there are any remaining tiles in the block that have not been tried. If there are one or more remaining tiles that have not been tried, at step 1175, one of the remaining tiles in the block is selected as the current tile to be stitched by the thread. If there are no remaining tiles in the block to be tried, the sub-thread process ends. Then, at step 1180, any remaining tiles to be stitched of any blocks are stitched using a single-thread process. These remaining tiles are tiles for which it was not possible for any thread to reserve all their neighboring tiles (e.g., because tiles were "shared" between multiple threads). The remaining tiles to be stitched are typically a small subset of the total number of tiles to be stitched, and therefore their processing in a single thread does not substantially impact performance.

In summary, the above description details techniques for reconstructing a coherent multi-resolution tiled mesh that preserves the 2.5D Delaunay property and provides other advantages over prior techniques. It should be understood that various adaptations and modifications may be readily made to what is described above, to suit various implementations and applications. While it is discussed above that many aspects of the techniques may be implemented in software (e.g., as executable instructions stored in a non-transitory electronic device readable medium for execution on one or more processors)\, it should be understood that some or all of the techniques may also be implemented in hardware, for example, in hardware of the GPU. A hardware implementation may include specially configured logic circuits and/or other types of hardware components. Above all, it should be understood that the above descriptions are meant to be taken only by way of example.

What is claimed is:

1. A method for reconstructing a coherent tiled mesh surface, comprising:
    building, by a software process executing on an electronic device, a spatial index for 2.5D data, the spatial index including nodes that correspond to a plurality of tiles of the 2.5D data;
    applying a 2.5D Delaunay triangulation algorithm to data of nodes of the spatial index to create a plurality of independent mesh surfaces that each correspond to a tile;

stitching, by the software process, the plurality of independent mesh surfaces together to form the coherent tiled mesh surface, the stitching, for each independent mesh surface, including:
removing boundary triangles and triangles influenced by neighboring tiles,
computing a polygon surrounding all the remaining triangles of the independent mesh surface,
triangulating points of removed triangles with a set of constraints that include constraints from neighboring tiles to produce a context, wherein the set of constraints used in the triangulating points of removed triangles include the computed polygon as a void constraint, and
merging the context and the remaining triangles of the independent mesh surface, to produce a stitched mesh surface; and
outputting the coherent tiled mesh surface.

2. The method of claim 1, wherein the coherent tiled mesh surface is a coherent, multi-resolution tiled mesh surface, and the method further comprises:
determining if a new level of detail (LOD) is required;
applying the 2.5D Delaunay triangulation algorithm to data of one or more nodes of the spatial index to create one or more independent mesh surfaces that have the new LOD; and
stitching, by the software process, the one or more independent mesh surfaces having the new LOD.

3. The method of claim 1, wherein the spatial index is a balanced tree spatial index, including a root node and a plurality of leaf nodes.

4. The method of claim 3, wherein the applying further comprises:
finding the plurality of leaf nodes of the spatial index;
applying the 2.5D Delaunay triangulation algorithm to data of each leaf node of the spatial index; and
returning the plurality of independent mesh surfaces.

5. The method of claim 1, wherein the applying the 2.5D Delaunay triangulation algorithm to data of nodes of the spatial index to create the plurality of independent mesh surfaces includes applying constraints.

6. The method of claim 5, wherein the applying constraints further includes:
fetching input constraints and tile boundary-related constraints;
merging constraints that intersect or overlap;
cutting constraints along a boundary polygon of the independent mesh surface; and
applying the merged, cut constraints during triangulation.

7. The method of claim 1, wherein the stitching is performed as a single-thread process when there is less than a predetermined number of tiles.

8. The method of claim 1, wherein the stitching is performed at least in part as a multi-thread process when there is greater than a predetermined number of tiles.

9. The method of claim 8, wherein the multi-thread process includes, for each independent mesh surface:
splitting the tile into a number of blocks associated with threads;
for each thread, selecting a tile from the associated block to stitch,
trying to reserve the selected tile's neighboring tiles,
when there are no neighboring tiles already reserved, reserving the neighboring tiles and stitching the selected tile,
when there are neighboring tiles already reserved, proceeding to a next tile; and
stitching any remaining tiles.

10. The method of claim 1, wherein the 2.5D data is 2.5D terrain data, and the coherent tiled mesh surface represents the surface of terrain.

11. The method of claim 1, wherein the 2.5D terrain data is captured by LiDAR.

12. A method for reconstructing a coherent tiled mesh surface, comprising:
building, by a software process executing on an electronic device, a spatial index for 2.5D data, the spatial index including nodes that correspond to a plurality of tiles of the 2.5D data;
applying a 2.5D Delaunay triangulation algorithm to data of nodes of the spatial index to create a plurality of independent mesh surfaces that each correspond to a tile;
stitching, by the software process, the plurality of independent mesh surfaces together to form the coherent tiled mesh surface, the stitching, for each independent mesh surface, including:
removing boundary triangles and triangles influenced by neighboring tiles, wherein triangles influenced by neighboring tiles include triangles whose circumcircle intersects the tile's boundaries,
triangulating points of removed triangles with a set of constraints that include constraints from neighboring tiles, to produce a context, and
merging the context and the remaining triangles of the independent mesh surface, to produce a stitched mesh surface; and
outputting the coherent tiled mesh surface.

13. The method of claim 12, wherein the coherent tiled mesh surface is a coherent, multi-resolution tiled mesh surface, and the method further comprises:
determining if a new level of detail (LOD) is required;
applying the 2.5D Delaunay triangulation algorithm to data of one or more nodes of the spatial index to create one or more independent mesh surfaces that have the new LOD; and
stitching, by the software process, the one or more independent mesh surfaces having the new LOD.

14. The method of claim 12, wherein the spatial index is a balanced tree spatial index, including a root node and a plurality of leaf nodes, and the applying further comprises:
finding the plurality of leaf nodes of the spatial index;
applying the 2.5D Delaunay triangulation algorithm to data of each leaf node of the spatial index; and
returning the plurality of independent mesh surfaces.

15. The method of claim 12, wherein the applying the 2.5D Delaunay triangulation algorithm to data of nodes of the spatial index to create the plurality of independent mesh surfaces includes applying constraints, wherein the applying constraints comprises:
fetching input constraints and tile boundary-related constraints;
merging constraints that intersect or overlap;
cutting constraints along a boundary polygon of the independent mesh surface; and
applying the merged, cut constraints during triangulation.

16. The method of claim 12, wherein the stitching is performed as a single-thread process when there is less than a predetermined number of tiles and the stitching is performed at least in part as a multi-thread process when there is greater than a predetermined number of tiles.

17. The method of claim 12, wherein the 2.5D data is 2.5D terrain data, and the coherent tiled mesh surface represents the surface of terrain.

18. An electronic device comprising:
a display screen;
a processor; and
a memory coupled to the processor configured to store tiles of 2.5D data and instructions of a coherent tiled mesh creation process, the instructions executable on the processor and when executed operable to:
access the tiles of a 2.5D data,
apply a 2.5D Delaunay triangulation algorithm to data of each tile to create a plurality of independent mesh surfaces that each correspond to a tile,
stitch the plurality of independent mesh surfaces together to form a coherent tiled mesh surface, at least in part, by removing boundary triangles and triangles influenced by neighboring tiles from the independent mesh surface wherein triangles influenced by neighboring tiles include triangles whose circumcircle intersects the tile's boundary, triangulating points of removed triangles with constraints, merging the context and the remaining triangles of the independent mesh surface to produce a stitched mesh surface, and cutting the stitched mesh surface resulting from the merging to the tile's boundaries, and
display the coherent tiled mesh surface on the display screen.

19. The electronic device of claim 18, wherein the coherent tiled mesh surface is a coherent, multi-resolution tiled mesh surface, and the instructions are further operable to:
determine if a new level of detail (LOD) is required,
apply the 2.5D Delaunay triangulation algorithm to data of the tiles to create one or more independent mesh surfaces that have the new LOD, and
stitch the one or more independent mesh surfaces having the new LOD.

20. A non-transitory electronic device-readable medium having executable instructions stored thereon, the instructions when executed on one or more processing units operable to:
apply a 2.5D Delaunay triangulation algorithm to a plurality of tiles of the 2.5D data to create a plurality of independent mesh surfaces that each correspond to a tile;
stitch, by the software process, the plurality of independent mesh surfaces together to form a coherent tiled mesh surface, the stitching, for each independent mesh surface including:
removing boundary triangles and triangles influenced by neighboring tiles from the independent mesh surface,
compute a polygon surrounding all the remaining triangles of the independent mesh surface,
triangulating points of removed triangles with a set of constraints that include constraints from neighboring tiles to produce a context, wherein the constraints used in the triangulating points of removed triangles include the computed polygon as a void constraint, and
merging the context and the remaining triangles of the independent mesh surface, to produce a stitched mesh surface; and
output the coherent tiled mesh surface.

21. The non-transitory electronic device-readable medium of claim 20, wherein the coherent tiled mesh surface is a coherent, multi-resolution tiled mesh surface, and the instructions when executed are further operable to:
determine if a new level of detail (LOD) is required;
apply the 2.5D Delaunay triangulation algorithm to data of one or more nodes of the spatial index to create one or more independent mesh surfaces that have the new LOD; and
stitch the one or more independent mesh surfaces having the new LOD.

22. A non-transitory electronic device-readable medium having executable instructions stored thereon, the instructions when executed on one or more processing units operable to:
apply a 2.5D Delaunay triangulation algorithm to a plurality of tiles of the 2.5D data to create a plurality of independent mesh surfaces that each correspond to a tile;
stitch, by the software process, the plurality of independent mesh surfaces together to form a coherent tiled mesh surface, the stitching, for each independent mesh surface, including:
removing boundary triangles and triangles influenced by neighboring tiles from the independent mesh surface, wherein triangles influenced by neighboring tiles include triangles whose circumcircle intersects the tile's boundary,
triangulating points of removed triangles with a set of constraints that include constraints from neighboring tiles, to produce a context, and
merging the context and the remaining triangles of the independent mesh surface, to produce a stitched mesh surface; and
output the coherent tiled mesh surface.

23. The non-transitory electronic device of claim 22, wherein the coherent tiled mesh surface is a coherent, multi-resolution tiled mesh surface, and the instructions when executed are further operable to:
determine if a new level of detail (LOD) is required;
apply the 2.5D Delaunay triangulation algorithm to data of one or more nodes of the spatial index to create one or more independent mesh surfaces that have the new LOD; and
stitch the one or more independent mesh surfaces having the new LOD.

* * * * *

UNITED STATES PATENT AND TRADEMARK OFFICE
CERTIFICATE OF CORRECTION

PATENT NO. : 10,255,716 B1
APPLICATION NO. : 15/232446
DATED : April 9, 2019
INVENTOR(S) : Elenie Godzaridis et al.

Page 1 of 1

It is certified that error appears in the above-identified patent and that said Letters Patent is hereby corrected as shown below:

In the Specification

Column 2, Line 12 reads:
"resolution so meshes in which tiles of a given LOD are fully"

Should read:
--resolution meshes in which tiles of a given LOD are fully--

Signed and Sealed this
Seventeenth Day of December, 2019

Andrei Iancu
*Director of the United States Patent and Trademark Office*